(12) United States Patent
Nonomura et al.

(10) Patent No.: US 7,462,261 B2
(45) Date of Patent: Dec. 9, 2008

(54) METHOD FOR PRODUCING FLANGED MOLDING

(75) Inventors: Akira Nonomura, Tochigi (JP); Atsushi Sato, Tochigi (JP); Shinji Kodama, Tochigi (JP); Minoru Goto, Tochigi (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/470,434

(22) PCT Filed: Apr. 4, 2002

(86) PCT No.: PCT/JP02/03392

§ 371 (c)(1),
(2), (4) Date: Jul. 28, 2003

(87) PCT Pub. No.: WO02/083402

PCT Pub. Date: Oct. 24, 2002

(65) Prior Publication Data

US 2004/0084166 A1 May 6, 2004

(30) Foreign Application Priority Data

Apr. 6, 2001 (JP) ............................. 2001-109180
Apr. 2, 2002 (JP) ............................. 2002-100362

(51) Int. Cl.
*D21F 13/00* (2006.01)
(52) U.S. Cl. ................. 162/218; 162/221; 162/223; 162/228; 162/227; 264/86; 264/87
(58) Field of Classification Search ................. 162/218, 162/221, 223, 226, 227, 397, 231, 219; 264/86, 264/87
See application file for complete search history.

(56) References Cited

U.S. PATENT DOCUMENTS 2,321,574 A * 6/1943 Chaplin ..................... 162/219
3,390,618 A * 7/1968 McArdle ..................... 493/95
4,130,234 A 12/1978 Schmidt (Continued)

FOREIGN PATENT DOCUMENTS

CN 1113462 A 12/1995

(Continued)

OTHER PUBLICATIONS

CD-ROM of the specification and drawings annexed to the request of Japanese Utility Model Apllication No. 26521/1992 (Laid-open No. 81729/1994) (Tomoegawa Paper Co., Ltd.), Nov. 22, 1994 (Nov. 11, 1994) Full text; all drawings (Family: none).

*Primary Examiner*—Mark Halpern
(74) *Attorney, Agent, or Firm*—Oblon, Spivak, McClelland, Maier & Neustadt, P.C.

(57) ABSTRACT

A method of producing a lipped molded article comprising the steps of forming a molded article having an opening portion by papermaking and outwardly curling the peripheral wall portion which constitutes the opening portion to make a lip. The method is characterized in that the inner surface of the molded article is coated with a resin layer to make a multi-layer molded article, the part to be curled of the peripheral wall portion of the molded article is impregnated with a liquid, and the part to be curled is subjected to curling processing while or after being heated.

4 Claims, 3 Drawing Sheets

U.S. PATENT DOCUMENTS

| | | |
|---|---|---|
| 4,609,140 A | 9/1986 | Van Handel et al. |
| 4,721,500 A | 1/1988 | Van Handel et al. |
| 5,571,224 A | 11/1996 | Aloisi et al. |
| 5,779,424 A | 7/1998 | Stoffel |
| 6,010,062 A | 1/2000 | Shimono |
| 6,066,375 A | 5/2000 | Shanton |
| 6,126,585 A | 10/2000 | Norwood et al. |

FOREIGN PATENT DOCUMENTS

| | | |
|---|---|---|
| CN | 1183753 A | 6/1998 |
| EP | 1 197 596 | 4/2002 |
| JP | 43-11512 | 5/1968 |
| JP | 52-139577 | 11/1977 |
| JP | 53-85682 | 7/1978 |
| JP | 81729/1994 | 11/1994 |
| JP | 2001-55699 | 2/2001 |
| JP | 2001-23318 | 8/2001 |
| WO | WO 00 58556 | 10/2000 |

* cited by examiner

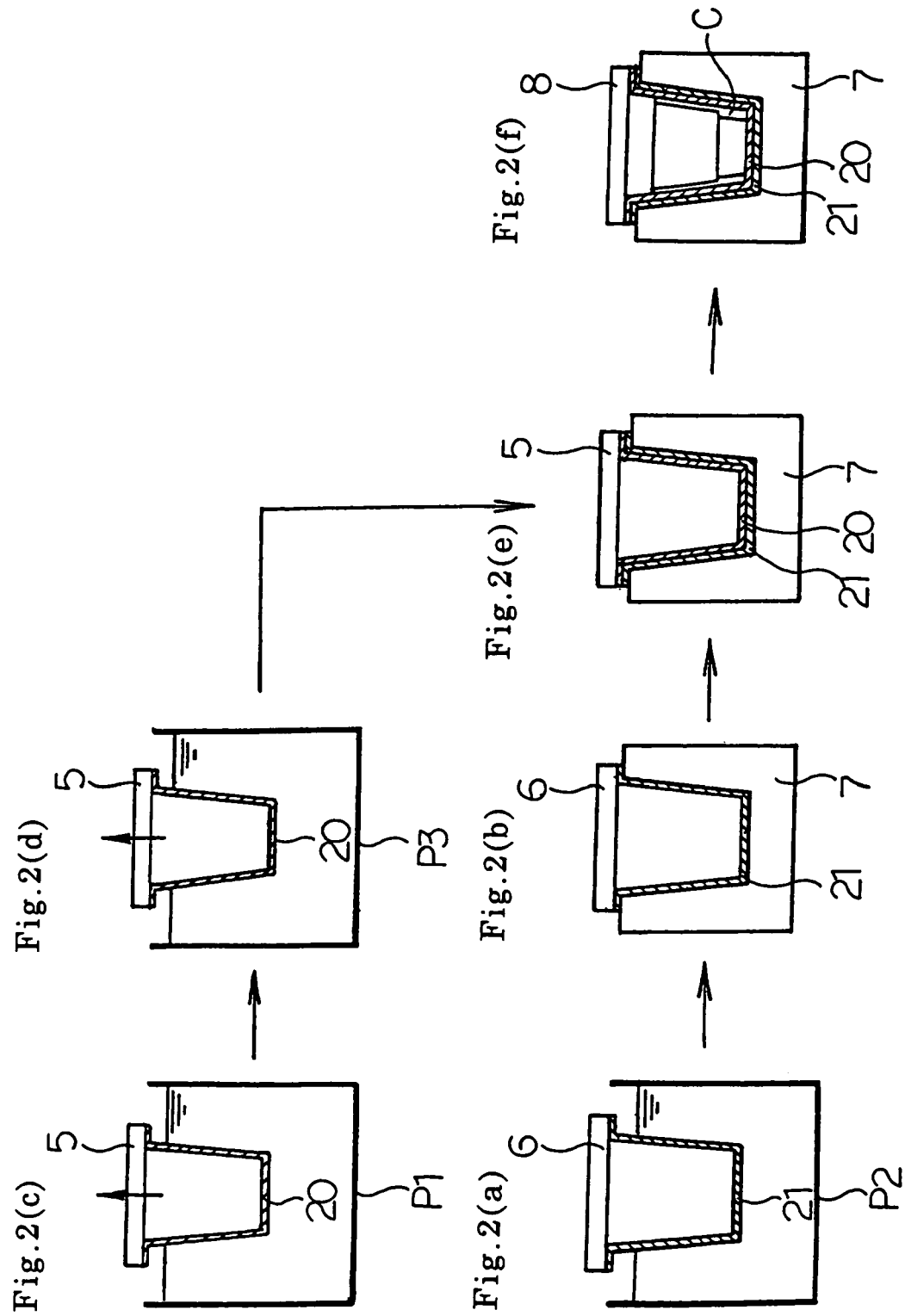

METHOD FOR PRODUCING FLANGED MOLDING

This application is a 371 of PCT/JP02/03392 filed Apr. 4, 2002.

TECHNICAL FIELD

The present invention relates to a method of producing a lipped molded article by using a molded article obtained by papermaking.

BACKGROUND ART

In a general process of producing a lipped or flanged container made of paperboard, it is a practice to make pre-cuts paperboard such that the directions of pulp fiber are substantially perpendicular to the circumferential direction of the container's body thereby to increase expandability in the body's circumferential direction in order not to cause buckling or break of pulp fiber in curling a flange. The technique of JPA-52-139577 is among such conventional techniques pertinent to production of paperboard containers.

To increase expandability in the circumferential direction of the container's body is effective for curling finish of the container's opening portion but unavoidably results in reduction of strength against grasping in the body's circumferential direction. As a result, the container's body is easily deformed when the container's body is grasped. Where, in particular, the method is applied to a container in which hot water is poured for cooking, such as a cup of an instant noodle, the container is so soft and inconvenient to grasp.

On the other hand, pulp molded articles have been attracting attention in the light of the resources and environmental issues. Pulp molded articles, having fibers oriented randomly, show smaller difference in elastic modulus depending on fiber orientation than traditional paperboard. However, when the opening portion of a dried molded article is curved as such, it easily suffers from buckling, wrinkling, break of pulp fiber (partial break of a container), and the like.

Accordingly, an object of the present invention is to provide a method of producing a lipped molded article which makes it possible to produce a molded article without involving wrinkling, buckling, break of pulp fiber, and the like in curling a flange.

DISCLOSURE OF THE INVENTION

The present invention accomplishes the above object by providing a method of producing a lipped molded article comprising the steps of forming a molded article having an opening portion by papermaking and outwardly curling the peripheral wall portion which constitutes the opening portion to make a lip, which is characterized by further comprising coating the inner side of the molded article formed by papermaking (hereinafter simply referred to as the molded article) with a resin film to make a multilayer molded article, impregnating the part to be curled of the peripheral wall portion formed by papermaking with a liquid, and curling the part to be curved while or after being heated.

BRIEF DESCRIPTION OF THE DRAWINGS

FIGS. 2(a) through (f) schematically show the steps involved in an embodiment of the method of producing a lipped molded article according to the present invention which is applied to the production of a lipped container, wherein (a) shows the step of forming an outer layer by papermaking; (b) the step of dewatering/drying the outer layer; (c) the step of forming an inner layer by papermaking; (d) the step of coating the outer surface of the inner layer with a blowing agent; (e) the step of superposing the inner layer and the outer layer; and (f) the step of drying.

BEST MODE FOR CARRYING OUT THE INVENTION

The present invention will be described based on its preferred embodiments with reference to the accompanying drawings.

Figure 1:
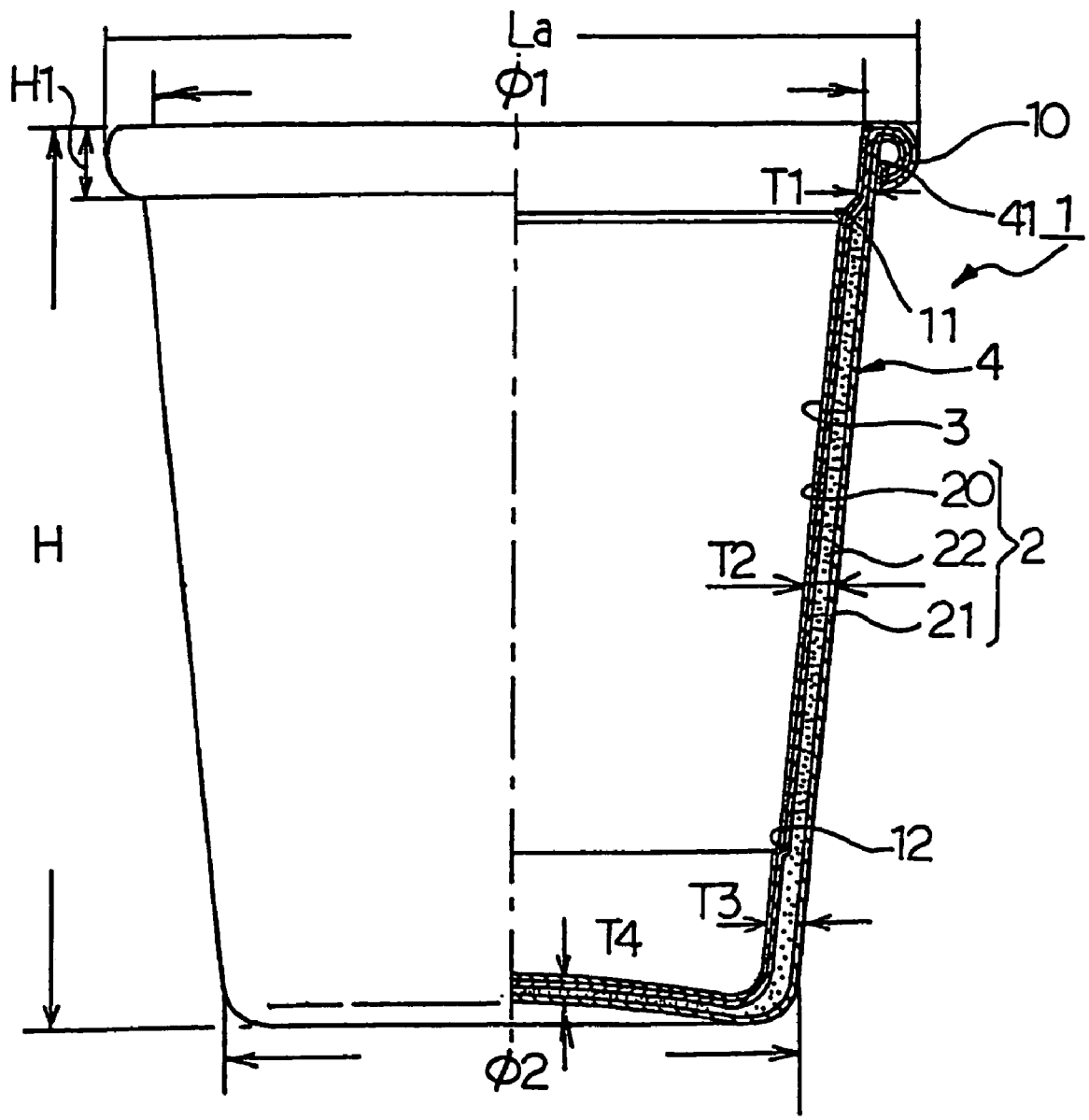
FIG. 1 is a half cross-section schematically illustrating a container produced by an embodiment of the method of producing a lipped molded article according to the present invention.

FIG. 1 shows an example of a container produced by an embodiment wherein the method of producing a lipped molded article according to the present invention is applied to production of a food container. In this figure, numeral 1 indicates the container.

As shown in FIG. 1, the container 1 is a lipped container comprising a multilayer container 4 having the inner surface (inner surface of a molded container 2) coated with a resin film (resin layer) 3 and having the part of the peripheral wall portion 41 which constitutes the opening portion 40 thereof outwardly curled to form a lip 10.

The molded container 2 consists of two layers formed by papermaking (hereinafter simply referred to as molded layer(s)), i.e., an inner layer 20 and an outer layer 21, and a blowing agent layer 22 sandwiched in between these two layers. The blowing agent layer 22 is not provided in the peripheral wall portion 41 of the multilayer container 4 which constitutes the lip 10 of the container 1. The container 1 has a pour mark 11 (a mark indicating the level to which hot water is to be poured) and a stacking shoulder 12.

The method of producing a lipped molded article according to the present invention is described hereunder with reference to production of the container 1 as a preferred embodiment of the method while referring to FIGS. 1 to 3.

In producing the container 1, the molded container (molded article) 2 must be prepared.

In preparing the molded container 2, the inner layer 20 and the outer layer 21 are prepared by separate papermaking. Each molded layer can be formed by using a set of papermaking molds consisting of male molds 5 and 6 and a female mold 7 (see FIG. 2) as hereinafter described.

The male molds 5 and 6 each comprise, for example, (1) a papermaking part which is a down-facing projection with a desired contour and has formed therein gas/liquid flow passageways leading to the outside and (2) a resin-made screen which has a predetermined mesh size and a predetermined wire diameter and covers the papermaking part. The papermaking part of the male molds 5 and 6 used for papermaking is made of a heat-resistant and anticorrosive elastic body, such as rubber. By using such molds having an elastic papermaking part, a molded article with a complicated surface profile or a deep drawn article can be obtained.

The female mold 7 is a metal-made mold having a depression whose inner shape corresponds to the papermaking part of the male molds 5 and 6. It is preferred for the female mold 7 to be equipped with a heating means so as to serve for not only dewatering but drying.

The inner layer 20 and the outer layer 21 are formed on the outer side of the screen of the male molds 5 and 6, respectively, in a wet state by, for example, as shown in FIG. 2(a) and (c), immersing the male molds 5 and 6 in the respective slurry tanks P1 and P2 and sucking the respective slurries through the respective gas/liquid flow passageways (not shown) to deposit pulp fiber on the respective screens (not shown).

The slurries used to form the inner layer 20 and the outer layer 21 preferably consist of pulp fiber and water. The pulp fiber may be either wood pulp fiber and non-wood pulp fiber and either virgin pulp fiber and recycled pulp fiber. In addition to the pulp fiber and water, the slurries may contain other components, including inorganic substances, such as talc and kaolinite, inorganic fibers, such as glass fiber and carbon fiber, particulate or fibrous synthetic thermoplastic resins, such as polyolefins, non-wood or plant fiber, polysaccharides, and so on. The amount of these components to be added is preferably 1 to 70% by weight, particularly 5 to 50% by weight, based on the total amount of the pulp fiber and the other components. The slurries may contain appropriate amounts of additives, such as dispersants for the pulp fiber, molding assistants, colorants, and coloring assistants. The slurries may further contain sizes, pigments, fixatives, and so forth. In particular, addition of a size is effective to prevent development of appearance defects, such as stains, on the outer surface of the outer layer 21. That is, when the outer layer 21 having been dried to a predetermined water content is united with the inner layer 20, which is still wet, the outer layer 21 can be prevented from absorbing the water of the inner layer 20.

In order to make the blowing agent to expand efficiently to form the blowing agent layer 22, it is preferred to dry the outer layer 21 to increase its density before joining with the inner layer 20. More concretely, after papermaking for a predetermined period of time, the male mold 6 is pulled up out of the slurry and fitted into the metal-made female mold 7 mating with the male mold 6 as shown in FIG. 2(b). A female mold having no air vents is preferably employed to leave no traces of the air vents on the surface of the outer layer 21, however a female mold having air vents may be employed to save a drying time of the outer layer 21. The wet outer layer 21 is dewatered by pressing the outer layer with the papermaking part of the male mold 6 to the male mold 7. The female mold 6 is heated by a heating unit (not shown) thereby to dry and to increase the density of the outer layer 21. While the outer layer 21 is dewatered and dried, the water (including steam) of the outer layer 21 is sucked through the gas/liquid passageways of the male mold 6 and drained outside. The pressing force applied to the outer layer 21 in the dewatering and drying is preferably 0.2 to 3 MPa, more preferably 0.3 to 1.5 MPa in terms of dewatering efficacy and density increase of the outer layer 21. The mold temperature for drying the outer layer 21 (i.e., the temperature of the female mold 7) is preferably 150 to 230° C., more preferably 170 to 220° C., from the standpoint of a prevention against scorching by heating and drying efficacy. After the outer layer 21 is dewatered and dried, the outer layer 21 is transferred to the female mold 7.

After the completion of the transferring, the male mold 6 is withdrawn.

The outer layer 21 is under densification process as described above, and the same time the outer surface of the inner layer 20 is coated with a blowing agent. Coating with a blowing agent is carried out by, for example, dipping the male mold 5 having the inner layer 20 formed thereon in a tank P3 filled with a blowing agent-containing liquid (i.e., a dispersion or a solution of a blowing agent) as shown in FIG. 2(d). The blowing agent-containing liquid is impregnated into the outer surface of the inner layer 20.

Any blowing agent that expands on heating can be used with no particular limitation. For preventing the pulp fiber of the inner layer 20 and the outer layer 21 from scorching upon heat expansion, a blowing agent which blows from 100 to 190° C. is preferred and from 110 to 160° C., is particularly preferred.

Blowing agents whose blowing temperature falls in the above range and which have dispersibility in water or in a slurry include microencapsulated blowing agents, expandable resins, and inorganic blowing agents such as sodium hydrogencarbonate. Among these blowing agents, microencapsulated blowing agents are preferred because of capabilities of reaching high expansion ratios and excellent handling properties. Examples of the microencapsulated blowing agents which are preferably used include those having butane, pentane, etc. as a core and polyvinylidene chloride, acrylonitrile, etc. as a capsule material. In addition, sodium hydrogencarbonate, an azo compound, a hydrazide compound, etc. (hereinafter referred to as "sodium hydrogencarbonate, etc.") kneaded into starch or a resin is also employable. Expandable beads comprising sodium hydrogencarbonate, etc., pulp, and starch are also useful.

The amount of the blowing agent is preferably 1 to 20% by weight, more preferably 3 to 10% by weight, based on the total weight of the container 1 for obtaining a predetermined density and thickness of the blowing agent layer 22 and from the standpoint of production cost.

The blowing agent-containing liquid may contain other components, such as pulp fiber, inorganic substances, e.g., talc and kaolinite, inorganic fibers, e.g., glass fiber and carbon fiber, particulate or fibrous synthetic thermoplastic resins, e.g., polyolefins, non-wood or plant fibers, and polysaccharides. The compounding ratios of the other components are selected appropriately so as not to result in an increase of density of the blowing agent layer, which may lead to reduction in heat insulating properties, or an increase of container's weight.

The inner layer 20 and the outer layer 21 are then superposed on each other with the blowing agent layer 22 interposed between the inner layer 20 and the outer layer 21. As shown in FIG. 2(e), the inner layer 20 impregnated with the blowing agent is superposed on the outer layer 21 which is set in the female mold 7 and has been dewatered and dried Without removing the inner layer 20 from the male mold 5, the male mold 5 is mated with the female mold 7. The inner layer 20 and the outer layer 21 are brought into intimate contact by pressing the inner layer 20 toward the inner wall of the female mold 7 with the papermaking part of the male mold 5 and the inner layer 20 is dewatered by removing its water through the gas/liquid flow passageways.

The pressing force exerted in dewatering the inner layer 20 between the male mold 5 and the female mold 7 is preferably 0.2 to 3 MPa, more preferably 0.3 to 1.5 MPa, to obtain increased dewatering efficiency and to unite the inner and outer layers thereby facilitating release of the inner layer from the male mold 5.

On completion of dewatering, the male mold 5 is released from pressure application and withdrawn. The inner layer 20 is left in the female mold. In the withdrawal of the male mold, compressed air may be ejected through the gas/liquid flow passageways of the male mold 5 to help the inner layer 20 be released from the male mold 5.

A metal-made male mold 8 having a prescribed clearance C in conformity with the change in total wall thickness of the container 1 at the shoulder is fitted in the female mold 7 and pressed as shown in FIG. 2(*f*). The male mold 8 has gas/liquid flow passageways similarly to the male mold 5 and is equipped with a heating unit (not shown). The male mold 8 and the male mold 7 are heated with the respective heating units to expand the blowing agent impregnating the inner layer 20. As a result, the blowing agent layer 22 decreases its density, and the inner layer 20 and the outer layer 21 are united into one body.

At the same time, the substantially horizontal flanges of the inner layer 20 and the outer layer 21 are joined together by the pressing force in drying. The joint strength between the inner layer 20 and the outer layer 21 in the portion which is to be subjected to secondary curling described later is preferably such that the secondary curling proceeds while allowing interlaminar sliding of the inner layer 20 and the outer layer 21. It is preferred to apply an adhesive to join the flanges with increased joint strength. Such an adhesive as starch is preferably used for application to food containers.

The pressing force applied to the male mold 8 and the female mold 7 in drying is preferably 0.2 to 3 MPa, more preferably 0.3 to 2 MPa, in order to join the flanges firmly and to smooth the flange surface.

It is preferred that a prescribed clearance be retained just before removal regardless of the pressing force in drying. During the drying, the water of the inner layer 20 is expelled as water vapor through the gas/liquid flow passageways of the male mold 8. The mold temperature in the drying is preferably 150 to 230° C., more preferably 170 to 220° C., in order to secure the expansion initiating of the blowing agent, to prevent from scorching of the inner layer 20 or the outer layer 21 and to attain high drying efficiency.

Heat drying is ceased when the blowing agent reaches a prescribed expansion ratio, and the inner layer 20 is dried up to a predetermined water content. The male mold 8 and the female mold 7 are separated to remove a molded container 2.

In view of adhesion of the film 3 to the inner layer 20 and prevention of pinhole generation in the film 3, it is desirable for the inner layer 20 of the molded container 2 to have the following surface smoothness on at least the area that becomes the inner wall of the container 1. At least this area of the inner layer 20 preferably has a center-line average roughness Ra of 1 to 20 µm as measured by the following method (measured in accordance with JIS B0601, hereinafter the same) and a maximum height Rmax of 100 µm or smaller as measured by the following method (measured in accordance with JIS B 0601, hereinafter the same), particularly an Ra of 2 to 10 µM and an Rmax of 80 µm or smaller.

Measurement of Surface Smoothness:

Surface roughness is measured with Surfcom 120A supplied by Tokyo Seimitsu Co., Ltd. The measuring conditions are:
 Cut-off: 2.5 mm
 Measurement length: 10.00 mm
 Filter: 2CR
 Magnification for Measurement: 500
 Tilt correction: linear
 Polarity: standard In order to exhibit satisfactory printability and the like, it is preferred for at least the area of the outer layer 21 of the molded container that becomes the exterior surface of the container 1 to have a center-line average roughness Ra of 1 to 8 µm, particularly 2 to 6 µm, and a maximum height Rmax of 60 µm or smaller, particularly 50 µm or smaller, both as measured in the same manner as for the inner layer 20. In contrast, it is preferred for the side of the outer layer 21 that is to come into contact with the blowing agent layer 22 to have a relatively rough surface so as to provide an increased contact area with the blowing agent layer 22, which will bring about enhanced adhesion strength. This can be achieved by using a coarse screen in papermaking.

As mentioned above, the molded container 2 has the blowing agent layer 22 formed between the inner layer 20 and the outer layer 21 thereby exhibiting prescribed heat insulating performance. Specifically, the heat insulating performance is preferably such that a temperature difference and a surface temperature as measured according to the following method are 20 to 40° C., particularly 25 to 35° C., and 50 to 65° C., particularly 55 to 60° C., respectively.

Evaluation of Heat Insulating Characteristics:

A cut piece of a molded article is pressed onto a hot plate of 90 to 100° C. The surface temperature of the cut piece is measured with a contact thermometer. When the temperature of the cut piece became steady, a difference between the surface temperature of the hot plate and that of the cut piece is measured.

In order to obtain the container 1 of a thin wall, the total wall thickness of the molded container 2, particularly that of the portion demanding heat insulation (for example, body thickness T2 in FIG. 1(*a*)) is preferably 0.8 to 5 mm, more preferably 1.3 to 5 mm, particularly preferably 1.6 to 4 mm.

The thickness of the inner layer 20 is preferably 0.2 to 1 mm, more preferably 0.4 to 1 mm, particularly preferably 0.5 to 1 mm, for securing papermaking stability, shape retention, thinness and lightness and yet satisfactory compressive strength, and for shortening the time required for papermaking or drying. From the same standpoint, the thickness of the outer layer 21 is preferably 0.2 to 1 mm, more preferably 0.4 to 1 mm, particularly preferably 0.5 to 1 mm.

Method of Thickness Measurement:

A specimen sliced from a molded article is observed under a tool maker's microscope to measure the thickness of each layer and the total thickness.

With regard to interaction of the inner layer 20 and the blowing agent layer 22, the outer layer 21 and the blowing agent layer 22, it is preferable that a mixed layer of the inner layer 20 and the blowing agent layer 22 be formed and that the inner layer 20 and the blowing agent layer 22 be firmly united via the mixed layer. It is also preferable that the outer layer 21 and the blowing agent layer 22 be united by fusion of the blowing agent. The firm bonding thus obtained between the inner layer 20 and the blowing agent layer 22 assures high heat insulating properties and shape retention even when hot water, etc. is poured in the molded container 2.

The molded container 2 shown in FIG. 3(*a*) is subjected to primary bending (preliminary curling) before its inner surface is coated with the film 3. Primary bending is effective to reduce the extension of pulp fibers in secondary bending (to reduce the stretch ratio in bending) thereby to prevent pulp fibers from breaking. Where primary bending is carried out to make a bend having a prescribed curvature beforehand, the curling load imposed in secondary bending is dispersed in the lateral direction. As a result, in the secondary bending, the static frictional force at the start of curling can be decreased. Moreover, because the film surface is securely brought into contact with a curling mold 95, curling is smoothly performed, and buckling is prevented. In this primary bending the flange 23 of the molded container 2 where the inner layer 20 and the outer layer 21 are joined together is curved outward as illustrated in FIG. 3(b).

The primary bending is carried out by using a mold 91 having an annular groove 90 of an almost semicircular cross-section with a predetermined curvature and a mold 93 which has an annular projection 92 corresponding to the annular groove 90 and holds the molded container 2. The molded container 2 is set into the mold 93, and the flange 23 of the molded container 2 is sandwiched in between the annular groove 90 of the mold 91 heated to a prescribed temperature and the annular projection 92 of the mold 93 and pressed under a predetermined pressure.

Figure 3C:
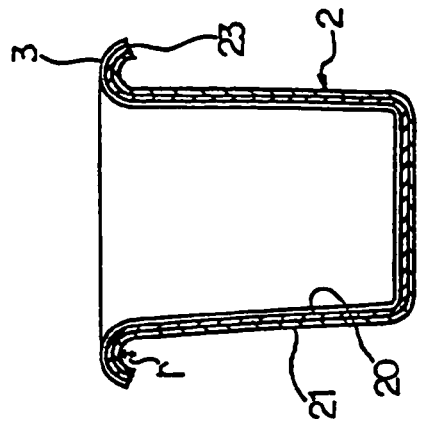
FIGS. 3(a) through (f) schematically show the steps involved in an embodiment of the method of producing a lipped molded article according to the present invention which is applied to the production of a lipped container; in which (a) shows a container formed by papermaking (hereinafter simply referred to as a molded container) before bending; (b) the molded container during primary curling; (c) the molded container coated with a resin film; (d) the molded container (multilayer container) after trimming of the tip of the container; (e) the multilayer container the peripheral wall portion of which is being impregnated with water; and (f) the multilayer container (lipped container) during secondary curling.

The primarily bent flange 23 preferably has a curvature radius r (see FIG. 3(c)) of 0.5 to 5 mm, particularly 1 to 3 mm. If the flange 23 is curved to an r of less than 0.5 mm, excessive stress may be applied to the pulp in the bending, which can cause pulp breakage. If the r exceeds 5 mm, the flange is so large that a considerable part of the flange should be trimmed off after the primary bending. Besides, the force to promote curling in the secondary bending will be lessened, easily causing wrinkles.

The temperature of mold 91 in the primary bending is preferably 70 to 180° C., more preferably 80 to 150° C., for preventing scorching of each layer and for softening the pulp fibers in the peripheral wall portion.

The primary bending may be conducted by blowing hot air to the flange 23 instead of heating the mold 91. A preferred temperature of the air blown is also 70 to 180° C., particularly 80 to 150° C., for preventing scorching and softening the pulp fibers.

The inner surface of the molded container 2 is then coated with a resin film 3 as shown in FIG. 3(c).

Coating with the film 3 is carried out in a usual manner, such as vacuum forming and pressure forming. Where vacuum forming is adopted, a vacuum forming mold which is substantially the same size as the mold 93 used in the primary bending and has vacuum ports and band heaters (not shown) is used. The semi-finished container is placed in the vacuum forming mold, and a resin film is set to cover the opening of the container. A plug equipped with a heater (not shown) is brought down to press the resin film into the mold while softening the resin film. At the same time, taking advantage of the air permeable property of the inner layer 20 and the outer layer 21 of the molded container 2, the molded container 2 is evacuated through the vacuum ports to thereby bring the film 3 into intimate contact with the inner surface of the inner layer 20.

The film 3 is not particularly limited in material, thickness, etc. as long as is capable of imparting an intended function, such as water resistance (leakproofness) or gas barrier properties. Useful films are those of thermoplastic resins including polyolefin resins, such as polyethylene and polypropylene, polyester resins, such as polyethylene terephthalate, polyamide resins, such as nylon, polyvinyl resins, such as polyvinyl chloride, and styrene resins, such as polystyrene. Preferred films are polyolefin resin films from the standpoint of film production cost and moldability. The film 3 may have either a single layer structure or a multilayer structure.

Figure 3F:
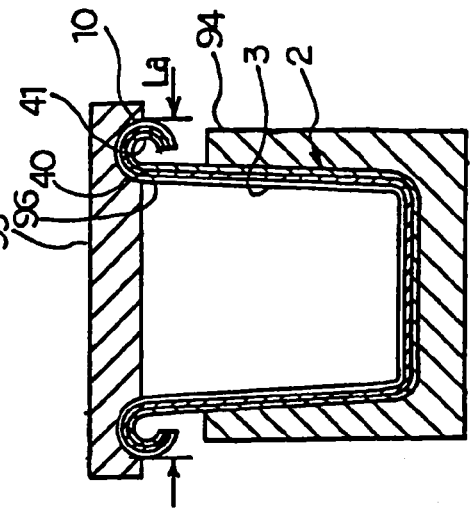
Figure 3B:
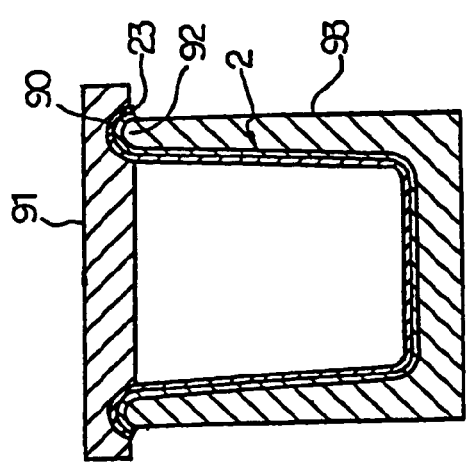
Figure 3E:
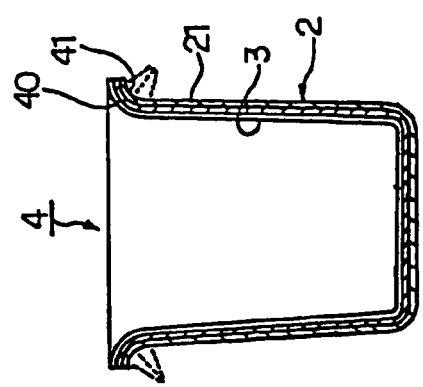
Figure 3A:
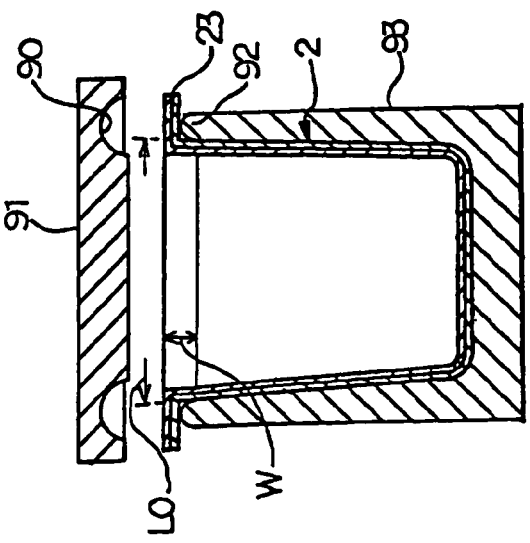
Figure 3D:
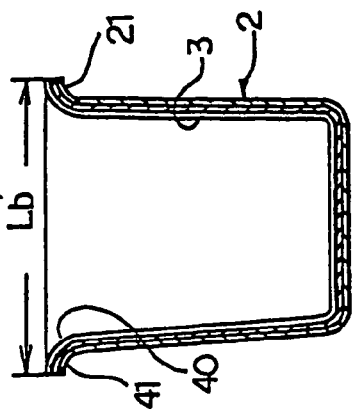

The peripheral wall portion 41 which constitutes the opening portion of the molded container 2 having its inner surface coated with the film 3 and the film 3 are trimmed to prepare a multilayer container 4 shown in FIG. 3(d).

To carry out trimming after coating with the film 3, the multilayer container is placed upside down on a cutting table, and a cutting unit having a cylindrical blade is pressed to the back side of the flange 23 (see FIG. 3(c)) to cut the periphery of the flange 23 and the film 3.

The outer diameter Lb of the opening portion 40 of the trimmed multilayer container 4 is decided from the inner diameter $\phi 1$ (see FIG. 1) of the rim of the finally obtained molded article, La/Lb (described infra), and (La−$\phi 1$)/$\phi 1$ (described infra). It is desirably small to enhance the force to promote curling of the flange into an aimed lip shape thereby to prevent wrinkles from occurring at the free end of the flange in the secondary bending. For example, where $\phi 1$=88 mm, La=93.2 mm, and (La−1)/$\phi 1$=0.059 as in Example hereinafter given, Lb is preferably 88.8 to 92.3 mm, more preferably 89.6 to 91.4 mm. With Lb of less than 88.8 mm, the edge of the peripheral wall portion undergoes large extension and may break in the secondarily bent process. With Lb of more than 92.3 mm, the tensile force acting on the peripheral wall portion 41 is so small that the force for promoting curling reduces, and the free end of the finally curled flange, namely, lip 10 is liable to suffer from wrinkles.

As shown in FIG. 3(e), a liquid is infiltrated into the part to be curled of the peripheral wall portion 41 which constitutes the opening portion 40 of the multilayer container 4. The part to be curled is a 3 to 5 mm wide area from the edge of the peripheral wall portion 41 in this particular embodiment. If the liquid infiltrates into a wider area of this part, buckling may occur in curling process.

A preferred content of the liquid (water content in case that water is used) in the part to be curled of the peripheral wall portion 41 is 10 to 30% by weight, particularly 15 to 25% by weight. With the liquid content of less than 10% by weight, the pulp still has a high tensile modulus, requiring an increased pushing load in the secondary bending, which can cause buckling of the container. Moreover, the pulp shows an insufficient increase in elongation. If the liquid content exceeds 30% by weight, on the other hand, the liquid penetrates not only the part to be curled of the peripheral wall portion but the lower area. It would follow that buckling may occur under the pushing load. The liquid content (water content in case of using water) of the part to be curled of the peripheral wall portion 41 is a value determined by the method described in Examples given infra.

The liquid which is infiltrated into the part to be curled of the peripheral wall portion 41 preferably includes water, lower alcohols having smaller surface tension than water (e.g., ethanol and methanol), and mixtures of water and lower alcohols. The manner of infiltrating the liquid is not particularly restricted, and various methods can be used. For example, the liquid or vapor of the liquid is sprayed to the said part, a brush containing the liquid is touched to the said part or the said part is dipped in a tank containing the liquid.

The peripheral wall portion 41 or the outer layer 21 of the multilayer container 4 preferably has a tensile modulus of 1200 to 4000 MPa, particularly 1400 to 3500 MPa, especially 1500 to 3000 MPa, in the peripheral direction. With the tensile modulus being less than 1200 MPa, the container 1 has reduced strength against grasping and, when the container holds contents in it, it may show large deformation and may be difficult to grasp. A tensile modulus exceeding 4000 MPa means that the pulp material has a long fiber length and a molded article with the long fiber length may have a poor appearance due to reduced surface smoothness.

The peripheral direction tensile modulus of the peripheral wall portion and the outer layer is a value obtained by cutting a test specimen of prescribed size out of the peripheral wall portion and the outer layer, fixing the specimen to the chucks of a tensile tester (the trade name is Tensilon, supplied by Toyo Baldwin Co., Ltd.), and pulling the specimen at a crosshead speed of 20 mm/min.

The peripheral wall portion infiltrated with the liquid preferably has a tensile modulus Ea of 100 to 1200 MPa, particularly 200 to 1100 MPa, especially 300 to 1000 MPa, in the peripheral direction when it is curled. With Ea of less than 100 MPa, the peripheral wall portion sometimes fails to be curled satisfactorily due to the small tensile strength. With Ea of more than 1200 MPa, the load to be applied for bending may be too high, which can cause buckling of the container in secondary bending.

As shown in FIG. 3(f), secondary bending (curling) is performed, in which the peripheral wall portion 41 is curved outwardly while being heated to form a lip 10.

The secondary bending is carried out by using a mold 94 having a depression in which the multilayer container is fitted and a curling mold 95 for curling the peripheral wall portion 41 of the multilayer container 4. The curling mold 95 has on its working surface an annular groove 96 for curling. The annular groove 96 has a substantially semi-circular cross-section with a predetermined curvature corresponding to the desired lip 10 of the container 1. The multilayer container 4 is placed in the mold 94 with its opening 40 up. The curling mold 95 previously heated to a prescribed temperature is moved down to fit the peripheral wall portion 41 into the annular groove. The curling mold 95 is further moved down to push the peripheral wall portion 41 downwardly at a predetermined speed. By use of the curling mold 95 having been previously heated to a prescribed temperature, the film (resin layer) 3 is heated to reduce its elastic modulus and thereby to reduce the load for stretching the film 3. Additionally, because the slip between the curling mold 95 and the film 3 becomes smooth, the pressing load of the curling mold in the secondary bending is reduced, and buckling of the peripheral wall portion 41 is averted. Further, since heat is supplied to the part of the secondary bending through the curling mold 95, drying of the said part is accelerated, and the curled shape is stabilized. By previously heating the curling mold 95, the heat loss of the hot air can be suppressed compared to use a non-heated curling mold where a hot air blow is employed in the secondary bending process.

The pushing speed of the curling mold 95 is preferably 10 to 150 mm/min, more preferably 20 to 100 mm/min. At a lower speed than 10 mm/min, interlaminar sliding (described later) hardly takes place, the curling processing time becomes longer, and the productivity may be reduced. At a speed higher than 150 mm/min, the required pushing load is so high that the two layers excessively slide with each other, which may cause interlaminar separation or buckling of the container.

In the secondary bending, the free end (edge) of the peripheral wall portion 41 is outwardly expanded along the annular groove 96. At this time, the circumference of the edge of the peripheral wall portion 41 gradually increases and a tensile force in the peripheral direction occurs. This tensile force reaches the maximum when the peripheral wall portion 41 is further pushed and the circumference reaches the maximum (about $\pi \times La$). On continuing pushing, the edge of the peripheral wall portion 41 is released from the restraint of the shape of the annular groove 96. Whereupon the edge begins to curl inward so as to release the tensile force, that is, to restore the initial circumference (about $\pi \times Lb$). As a result, a curled flange (lip 10) is formed.

During the secondary bending, it is preferred to induce interlaminar sliding between the inner layer 20 having the film 3 adhered thereto and the outer layer 21 with no film 3 because of the difference between these layer in tensile force imposed during the curling (described later). Induction of such interlaminar sliding leads to reduction of pushing load. The reduction can cause an improvement of appearance by virtue of control on wrinkles, and prevention of buckling by pushing.

Curling of the peripheral wall portion 41 in the secondary bending process is preferably such that the ratio of the outer diameter La (see FIG. 3(f)) of the opening portion after processing to the outer diameter Lb of the opening portion before the process (La/Lb) falls in a range of 1.01 to 1.05, particularly 1.02 to 1.04, wherein Lb is the outermost diameter of the trimmed peripheral wall portion. When the value of La/Lb falls in the range of 1.01 to 1.05, the secondary bending process can be performed without an excessive stress applied to the peripheral wall portion 41 which is being curled along the annular groove 96. As a result, the occurrence of breaks, buckling, and wrinkles in the peripheral wall portion 41 (the free end of the lip 10) are inhibited, and the occurrence of wrinkles in the edge of the curled peripheral wall portion 41 are prevented.

The ratio of the difference between the outer diameter La and the inner diameter $\phi 1$ of the opening portion (see FIG. 1) after the curling processing to the inner diameter $\phi 1$ of the opening portion, namely $(La-\phi)/\phi 1$, is preferably 0.045 to 0.09. This is preferred for preventing breakage of the opening portion and bending and wrinkling of the lip 10 in the secondary bending and also for successful curling of the flange 10.

The curvature radius r of the end of the peripheral wall portion 41 (i.e., the lip 10) that has been bent by the secondary bending is preferably 1.0 to 2.5 mm, more preferably 1.2 to 2.0 mm. To obtain a curvature radius smaller than 1.0 mm, an excessive stress may be applied to the pulp fiber, which can cause breaks of the container. Where the curvature radius exceeds 2.5 mm, the pulp fiber may be stretched excessively, resulting in breakage of the container.

The heating temperature of the curling mold 95 is preferably 50 to 110° C., more preferably 60 to 100° C., in order to avert melting of the film 3 and scorching of the container 1 and to soften the pulp fiber and the film thereby assuring satisfactory slip in the annular groove of the curling mold and preventing breakage of the film. Instead of, or in addition to, heating the curling mold 95, hot air may be blown to the peripheral wall portion 41. In this case, the temperature of the hot air is preferably 50 to 110° C., more preferably 60 to 100° C., from the same viewpoint with respect to the heating temperature of the curling mold.

After completion of the secondary bending process, the container is subjected to coating, printing or like if necessary. Production of the container 1 is thus completed.

The thus produced container 1 is free from buckling and has neither wrinkles nor bents in its lip 10. The outer layer of the container 1 having a density of 0.4 to 1.2 g/cm$^3$, the container 1 is excellent in buckling strength and grasping strength and has a satisfactory appearance with high surface smoothness and little color change of pulp fiber.

The density of the outer layer of the container 1 is calculated from the thickness and weight of a specimen of prescribed size cut out of the molded outer layer.

The peripheral wall portion 41 of the multilayer container 4 having a peripheral direction tensile modulus falling within the above-recited range, the container is less prone to deformation and is easy to grasp when the container holds the contents in it. The molded article exhibits excellent appearance with satisfactory surface smoothness. Since the lip 10 is curled inwardly, the free end of the lip 10 has less chance to contact with something (e.g. water, etc.). This configuration of the lip 10 can give smooth touch to the human mouth, good looks and sanitary goodness.

As described above, in the method of producing the container 1 according to the present embodiment, a liquid is infiltrated into the part to be curled of the peripheral wall portion 41 which constitutes the opening portion 40 of the multilayer molded article 4. The part to be curled is then curled by the curling mold 95 under heating. This curling method enables the curling process to reduced pushing load to form the lip 10 without causing wrinkles, buckling, pulp fiber breaks, and the like.

In the present embodiment, since a resin layer is provided by covering the inner surface of the molded container 2 with the film 3 before secondary bending, the curling mold enjoys improved slip on the film side in the secondary bending process. It follows that the pushing load of the curling mold can be reduced, and the opening portion 40, the peripheral wall portion 41, etc. of the multilayer container 4 are prevented from buckling during the secondary bending, and the lip 10 is prevented from bending or wrinkling. In addition, the resin layer acts as a reinforcing layer whereby the pulp fiber is protected from breaking during the secondary bending.

Since the peripheral wall portion is curled to such a degree that the ratio of the outer diameter La of the opening portion after curling processing to the outer diameter Lb of the opening portion before curling processing (La/Lb) may fall within a range of 1.01 to 1.05, the free end of the flange 10 is inhibited from stretching excessively, and a tensile force is created in the free end of the flange 10 to develop a force accelerating curling. As a result, the lip 10 is formed without wrinkles, buckling, breaks of pulp fiber, and the like.

The container 1 produced in the present embodiment has the inner layer 20, the outer layer 21, and the blowing agent layer 22 interposed therebetween, all in one body. Therefore, it is thin-walled and yet excellent in heat insulating properties and mechanical strength (compressive strength).

Since the container 1 has a smooth surface and no joint seams on the inner and outer surfaces, it exhibits satisfactory adhesion to a film used as a resin layer and also satisfactory properties for printing on the surfaces.

In addition, the container 1 has its total wall thickness and total wall density varied in the vertical direction of the body thereof to control (in proportion to) the expansion ratio of the blowing agent. It is possible that the expansion ratio is held small to increase strength in the vicinity of the lip where heat insulation is not so demanded. It is also possible that the expansion ratio is held large to ensure heat insulation in the portion from the middle of the body to the bottom where heat insulation is demanded. In other words, the container 1 is a superior one which can have necessary heat insulating performance and necessary strength according to the portion demanded.

Having excellent heat insulating properties, the container 1 is useful for holding high-temperature foods and hot drinks. As a matter of course, the container 1, hardly causing dew formation on its surface, is also useful as a container for cold foods and cold drinks.

The present invention is not limited to the above-described embodiment, and modifications and alterations can be made thereto as far as such are not a departure from the spirit of the present invention.

For example, while in the above embodiment a flanged container is once molded and then subjected to primary bending (curling) process, it is possible to prepare a molded container having the peripheral edge of the opening portion thereof shaped to have a prescribed curvature. This is a preferred modification that enables omission of the primary bending processing.

Where the present invention is applied to production of containers, particularly to cups of the above-described embodiment, a portion with the wall thickness and wall density varied in proportion to the expansion ratio of the blowing agent is preferably provided in the container body (the portion to be held by hand). The position where to provide a portion with the wall thickness and wall density varied in proportion to the expansion ratio of the blowing agent can be selected according to the container's shape, however. For example, a dish can be designed to have varied wall thickness and wall density (such a portion) in its body and other portions, e.g., the bottom. A stacking shoulder of the container is able to be formed according to demand.

In applying the present invention to production of containers, it is preferred for the molded container to have a blowing agent layer as a heat insulating layer as in the aforementioned embodiment. However, a heat insulating layer may be formed by making a gap in a prescribed portion between the inner and outer layers. A heat insulating layer may be omitted depending on the use of the container.

Where the present invention is applied to the production of containers, while it is preferred for the molded container to be used to have a dual molded layer structure composed of the inner and outer layers as in the aforementioned embodiment, the molded container may have a single layer structure.

Where the present invention is applied to the production of containers, the molded container to be used is preferably prepared by previously drying to increase the density of the outer layer and then superposing the inner layer and the outer layer to unite them as described above. It is possible that the outer layer is not previously dried, and the inner and outer layers are superposed and then dried together.

It is preferred that the exterior surface of the inner layer is coated with the blowing agent by immersing the exterior surface of the inner layer in a liquid containing the blowing agent as described above. It is also possible to apply the liquid to the exterior surface of the inner layer by spraying or a like method.

While the present invention is specially suited to produce lipped containers as in the above-described embodiment, it is also applicable to the production of other lipped molded articles such as a lipped cylindrical articles.

EXAMPLES

The present invention will now be illustrated in greater detail by way of Examples.

In Examples 1 to 5 and Comparative Examples 1 and 2, containers having the shape shown in FIG. 1 (lipped containers) were produced as described below. The water content by weight of the part to be curled of the peripheral wall portion of a container before curling (multilayer molded article) was measured. The resulting containers were undergone inspection of buckling, breaks, and wrinkles and evaluated as described later. The results of measurement and evaluation are shown in Table 1.

Example 1

Geometry of Container:
  Height H: 110 mm
  Opening inner diameter $\phi 1$: 88 mm
  Bottom outer diameter $\phi 2$: 70 mm
  Lip maximum outer diameter La: 93 mm
  Lip height H1: 3.5 mm
  Upper body thickness T1: 0.8 mm
  Middle body thickness T2: 1.5 mm
  Lower body thickness T3: 2.0 mm
  Bottom thickness T4: 1.0 mm Preparation of Inner and Outer Layers by Papermaking:

Male molds having a silicon rubber-made papermaking part shaped in conformity to the inner layer and the outer layer, respectively, of a container to be molded and a nylon screen (50 mesh, wire diameter: 100 μm) on the papermaking part were immersed in the respective slurries having the following compositions to form the respective pulp layers thereon.

Slurry for Outer Layer:
  Pulp slurry: pulp fiber (virgin pulp/high grade used paper=3/7); pulp slurry
  concentration: 0.5 wt %
  addition of a sizing: 2 wt % with respect to pulp Slurry for Inner Layer:
  Pulp slurry: pulp fiber (virgin pulp/high grade used paper=3/7); pulp slurry
  concentration: 0.5 wt %
  addition of a sizing: 2 wt % with respect to pulp Outer Layer Dewatering and Drying Conditions:

The outer layer was fitted between the male mold and a mating female mold and dewatered and dried under the following conditions. After the drying, starch glue was applied to the flange of the outer layer.
  Mold temperature: 200° C.
  Pressing force and time: 0.4 MPa and 180 seconds Coating of Outer Surface of Inner Layer with Blowing Agent:

The inner layer was dipped in a blowing agent-containing liquid having the following composition to impregnate the blowing agent into the body portion of the inner layer.

Blowing Agent-Containing Liquid:
  Water containing a blowing agent (trade name is Matsumoto Microsphere F82, available from Matsumoto Yushi-Seiyaku Co., Ltd.; blowing temperature: 160 to 170° C.) in a concentration of 1 wt %, which corresponded to 5 wt % with respect to the total weight of a molded article.

Heat Drying Conditions:

The inner and outer layers were superposed and dried under the following conditions to expand the blowing agent and unite the inner and outer layers into one body.
  Mold temperature: 200° C.
  Pressing load and time: 11760 N and 180 seconds Primary Bending Processing:

The flange of the molded container was outwardly curled under the following conditions.
  Mold (aluminum-made) surface temperature: 130° C.
  Male mold (aluminum-made) surface temperature: 50° C.
  Pressing load: 11760 N
  Curvature radius: 1.5 mm Preparation of Multilayer Container:

A resin composite film described below was set on the molded container with its inner layer side in contact with the inner layer of the molded container, and the container was coated with the resin composite film under the following forming conditions. After laminating, an unnecessary part of the film was cut off.

Resin Film:
  Outer layer/inner layer=high density polyethylene/low density polyethylene
  Resin film thickness: 150 μm Forming Conditions:
  Vacuum forming machine: PLAVAC-FE36PHS, supplied by Sanwa Kogyo K.K.
  Film heating system: infrared heater (heater-to-resin film distance: 110 mm)
  Film heating temperature: 250° C. (reading of the forming machine)
  Film heating time: 35 seconds
  Plug dimensions: 60 mm diameter×110 mm length
  Plug material: aluminum (coated by Teflon™)
  Plug temperature: 115° C. (measured surface temperature)
  Vacuum forming mold: opening diameter $\phi 88$ mm; bottom diameter $\phi 70$ mm; height 110 mm
  Vacuum forming mold temperature: 115° C. (measured surface temperature of cavity side)
  Forming time: 15 seconds Trimming:

The peripheral edge of the multilayer molded article was trimmed with a punching blade having an inner diameter φ of 91 mm to prepare a multilayer container having a maximum outer diameter La of about 91 mm in the opening portion.

Secondary Bending Process:

Water was infiltrated into the part to be curled of the peripheral wall portion 41 of the multilayer molded article which constituted the opening portion 40. The water content of said part was 22 wt %. Then the peripheral wall portion 41 constituting the opening portion 40 of the multilayer container 4 was secondarily bent under the following conditions to form a lip 10.
  Curling mold (aluminum-made) surface temperature: 90° C.
  Curling mold pushing speed: 20 mm/min

Examples 2 to 5

Containers were produced in the same manner as in Example 1, except that the water content of the part to be curled of the peripheral wall portion before the secondary bending processing was changed as shown in Table 1 and secondary bending was then carried out while heating.

Comparative Examples 1 and 2

Containers were produced in the same manner as in Example 1, except that water was not infiltrated into the part to be curled of the peripheral wall portion.

Method of Measuring Water Content Before Secondary Bending:

The water content of the part to be curled of the peripheral wall portion before secondary bending was measured as follows. Water was infiltrated into the part to be curled of the peripheral wall portion 41 of the molded container 2 (see FIG.

3(d)) as shown in FIG. 3(e). After wiping off excessive water from the surface, a ring-shaped specimen having the following dimensions (the total weight: about 0.5 g, the film weight: about 0.05 g) was cut out. The water content of the specimen was measured in accordance with JIS P8127 (Paper and board—Determination of moisture content).

Dimensions of Test Specimen:
 Outer diameter L0 of the end of peripheral wall portion (see FIG. 3(a)):
 90 mm
 Width W (see FIG. 3(a)): 3 mm
 Thickness: 0.8 mm Evaluation on Buckling Resistance:
 The resulting container was inspected with the naked eye for buckling and rated on the following A-to-C scale.
 A No buckling
 B A small bend(s) or a wrinkle(s) developed in the lip 10 but no buckling, bends or wrinkles was observed in the body or bottom of the container 1.
 C Buckling occurred in the body near the lip 10.

Evaluation on Breakage Resistance:
 The free end of the lip of the resulting container was inspected with the naked eye for breaks and rated on the following A-to-C-scale.
 A No breaks
 B A small crack(s) developed.
 C A break(s) or a crack(s) developed.

Evaluation on Wrinkle Resistance:
 The free end of the lip of the resulting container was inspected with the naked eye for wrinkles perpendicular to the peripheral direction (vertical wrinkles) and rated A or B as follows.
 A No wrinkles
 B Wrinkles observed.

Overall Evaluation:
 The resulting container was comprehensively evaluated on the following A-to-C scale.
 A Satisfactory in appearance, free from buckling or breakage.
 B Inferior in appearance but non-problematical for practical use as a container.
 C Unacceptable for use as a container due to development of breakage and buckling. Poor appearance.

As shown in Table 1, it was ascertained that the containers of Examples 1 to 5, in which the part to be curled of the peripheral wall portion had previously been infiltrated with water before curling and then curled into a lip under heat, suffered from neither buckling nor breaks. It was confirmed, on the other hand, that the containers of Comparative Examples 1 and 2, in which the part to be curled of the peripheral wall portion was subjected to curling process without water infiltration suffered from buckling, breaks or wrinkles.

INDUSTRIAL APPLICABILITY

The present invention provides a method of producing a lipped molded article in which flange curling process can be carried out without causing wrinkles, buckling, breaks of pulp fibers, and the like.

The invention claimed is:

1. A method of producing a lipped molded article comprising the steps of:
 coating an inner surface of a molded article formed by papermaking with a resin layer to make a multilayer molded article;
 infiltrating a liquid into a peripheral portion of a wall of an opening portion of the multilayer molded article; and
 outwardly curling the wall of the opening portion of the multilayer molded article while or after being heated to make a lip,
 wherein said molded article formed by papermaking comprises at least two layers which are separately molded by papermaking and joined together, wherein outwardly curling includes,
 partially curling the wall with a first die;
 adding liquid to the partially curled wall; and
 further curling the partially curled wall after the liquid is added.

2. The method according to claim 1, further comprising applying a blowing agent between the two layers.

3. The method according to claim 2, wherein the blowing agent is not applied to the lip.

4. The method of producing a lipped molded article according to claim 1, wherein said at least two layers are slid on each other in said wall of the opening portion when said wall of the opening portion is curled.

TABLE 1

|  | Example | | | | | Comparative Example | |
| --- | --- | --- | --- | --- | --- | --- | --- |
|  | 1 | 2 | 3 | 4 | 5 | 1 | 2 |
| Film | yes | yes | yes | yes | yes | yes | yes |
| Pre-curling Water infiltration | yes | yes | yes | yes | yes | no | no |
| Pre-curling Water Content (%) | 22 | 18 | 7 | 12 | 18 | 4 | 4 |
| Pre-curling Outer Diameter Lb (mm) | 91 | 91 | 91 | 89 | 93 | 91 | 91 |
| Post-curling Outer Diameter La (mm) | 95.2 | 92.5 | 93.2 | 95.1 | 93.4 | 95.2 | 93.2 |
| La/Lb | 1.046 | 1.016 | 1.024 | 1.069 | 1.004 | 1.046 | 1.024 |
| (La-φ1)/φ1 | 0.0818 | 0.0511 | 0.0591 | 0.0807 | 0.0614 | 0.0818 | 0.0591 |
| Buckling | A | A | B | A | A | C | C |
| Breakage | A | A | A | B | A | C | A |
| Wrinkle | A | A | A | A | B | A | A |
| Overall Evaluation | A | A | B | B | B | C | C |

* * * * *